United States Patent
Warne

[19]

[11] Patent Number: 5,862,738
[45] Date of Patent: Jan. 26, 1999

[54] ELECTRONIC BREW CONTROL SYSTEM

[75] Inventor: Thomas I. Warne, Oakville, Canada

[73] Assignee: Bloomfield Industries Canada Limited, Mississauga, Canada

[21] Appl. No.: 982,463

[22] Filed: Dec. 2, 1997

Related U.S. Application Data

[63] Continuation-in-part of Ser. No. 777,584, Dec. 31, 1996, Pat. No. 5,704,275.

[51] Int. Cl.$^6$ .............................. A47J 31/00; A47J 31/10; A47J 31/34; A47J 31/42
[52] U.S. Cl. .................................. 99/281; 99/285; 99/293; 99/291
[58] Field of Search .............................. 99/485, 486, 468, 99/330, 279–285, 291, 293, 294, 299, 300, 307, 316, 516, 534; 219/497, 490–492, 505, 501, 494; 392/323, 324, 441, 480, 481, 467; 426/231, 433

[56] References Cited

U.S. PATENT DOCUMENTS

| | | | |
|---|---|---|---|
| 3,641,918 | 2/1972 | Schellgell et al. | 99/279 |
| 3,771,432 | 11/1973 | Karlen | 99/304 |
| 4,468,406 | 8/1984 | D'Arc | 426/231 |
| 4,484,515 | 11/1984 | Illy | 99/282 |
| 4,793,513 | 12/1988 | Verheijen | 222/14 |
| 4,825,759 | 5/1989 | Grome et al. | 99/285 X |
| 4,833,978 | 5/1989 | Martone et al. | 99/280 |
| 4,872,402 | 10/1989 | Johnson et al. | 99/285 X |
| 4,920,871 | 5/1990 | Anson et al. | 99/295 |
| 5,014,611 | 5/1991 | Illy et al. | 99/280 |
| 5,063,836 | 11/1991 | Patel | 99/281 |
| 5,080,008 | 1/1992 | Helbling | 99/280 |
| 5,241,898 | 9/1993 | Newnan | 99/280 |
| 5,251,541 | 10/1993 | Anson et al. | 99/280 |
| 5,307,733 | 5/1994 | Enomoto | 99/280 |
| 5,377,299 | 12/1994 | Anson et al. | 392/441 X |
| 5,402,705 | 4/1995 | Bailleux et al. | 99/281 |
| 5,404,794 | 4/1995 | Patel et al. | 99/280 |
| 5,503,060 | 4/1996 | Morecroft et al. | 99/295 |

FOREIGN PATENT DOCUMENTS

| | | | |
|---|---|---|---|
| 0 204 411 | 4/1986 | European Pat. Off. | A47J 31/56 |
| 0 244 010 | 4/1987 | European Pat. Off. | A47J 31/56 |
| 1 454 231 | 2/1969 | Germany . | |

*Primary Examiner*—Timothy F. Simone
*Attorney, Agent, or Firm*—Donald E. Hewson

[57] ABSTRACT

A control system for a coffee brewer having a microprocessor in which the water heated in the heater tank must be a predetermined temperature before brewing. A double brewing cycle is prevented. Upon the system not being activated for a period of time, i.e., the water temperature is allowed to drop a greater magnitude for energy saving and component protection.

17 Claims, 4 Drawing Sheets

ELECTRONIC BREW CONTROL SYSTEM

CROSS-REFERENCE

This application is a Continuation-In-Part application of U.S. patent application Ser. No. 08/777,584, filed Dec. 31, 1996, U.S. Pat. No. 5,704,275.

BACKGROUND OF THE INVENTION

This invention relates in general to a beverage brewing apparatus and more particularly to a electronic brew control system for automatic coffee makers.

DESCRIPTION OF THE PRIOR ART

Automatic coffee brewers have long been in service at offices, restaurants and the like. Automatic coffee brewers allow coffee to be quickly brewed with highly desirable flavor. In use of known coffee brewers, several problems are present. Brewers with electromechanical thermostats generally allow a 10° F. drop in water temperature before reheating. When coffee is brewed at the higher temperature, it will extract more flavor from the coffee grounds, while coffee brewed at the lower temperature will be weaker as it will not extract the maximum amount of flavor. In known brewers, the temperature of the final coffee product can differ by as much as 10° F. depending at what temperature the brew took place. This means that the shelf life of the coffee brewed at the lower temperature could be two or three hours less than if brewed at the higher (correct) temperature. Known coffee brewers have not satisfactorily solved the problem of temperature differential of the water during service.

In addition, most current brewers will allow a "double brew." This condition arises if the brew button is pushed a second time after the first brew has been partially completed. As a result the coffee pot is overfilled and, occasionally, internal overfilling of the coffee brewer apparatus itself occurs. Coffee brewers are also exposed to severe operating conditions and extended service times reducing the component lifetime of the parts and wasting energy if the brewer is not being used during a particular period. Coffee brewers often are plugged in and left running twenty-four hours a day, three hundred and sixty five days a year during this period. The majority of known brewers reheat the water every time the temperature has dropped 10° F. In reheating the water to maintain the 10° F. differential, the brewer is often heating water when there is no demand for coffee, and therefore wasting energy as well as causing extensive wear on components. Accordingly, it is desirable to provide an electronic brew control system in which the differential in water temperature in the heating tank is reduced during operation, the possibility of double brewing is eliminated, and an extended component life is attained with reduced energy consumption.

SUMMARY OF THE INVENTION

An objective of this invention is to provide an improved electronically controlled coffee brewer in which a microprocessor selectively controls operation to overcome the foregoing problems associated with prior art coffee brewers. The coffee brewer of this invention includes means to better regulate the temperature of the water in a manner that the coffee product is not undesirably brewed by water at a lower temperature. Whenever the brew button is pushed, the coffee brewer of this invention senses the water temperature in the tank to determine whether it is at or above the set temperature. If it is, the brew proceeds immediately. On the other hand, if the water is not at the appropriate temperature, the water is heated to the precise temperature before allowing the product to proceed. By such a technique, consistent coffee quality and temperature is maintained.

The invention also eliminates the problem of double brewing as in the prior art. The coffee brewer herein disclosed includes a timer which is set at the length of time that the coffee will actually brew as opposed to the length of time that the solenoid valve is open, as in the prior art. While the counter is counting down, a second brew is impossible during the countdown of the timer. Upon the timer sensing its preselected time interval, another brew can be registered in the system, subject to the correct temperature being established for the water.

The coffee system of the invention further improves component life and allows for energy savings, by incorporating a reduced operating mode during idle conditions of the brewer. For example, if the brew button is not pushed at least every three hours, or at another selected interval, the water is only reheated after a drop of 25° F. to 30° F., or other great amount as opposed to a 10° during its normal service mode. As a result, the coffee brewer cycles through reheating about one-third as frequently as in the normal mode. Such a reduction of recycling during this "after hours"[1] mode is particularly important in extending the life of the components, particularly the relay controlling the heating element since that relay has an expected life of about 200,000 cycles. Without the after hours mode, the typical life span of a relay would be six to eight years. But by the reduction of cycling as a result of the after hours mode, as in the present invention, the lifetime of the components would be extended considerably and in many cases, it is estimated that the service life could be doubled as compared to the prior art. If the brew button is pushed during the after hours mode, the brewer reverts back to normal operation allowing 10° F. drops before reheating.

[1] AFTER HOURS is a trademark of Bloomfield Industries, of Verdi, Nev. USA.

The invention further incorporates certain safety features by which if the heating element is on for a predetermined period of time, for example four minutes continuously, and the temperature fails to change by ±2° F. or similar amount, the heating element will be turned off and an indicator will then indicate that the brewer must be reset. The foregoing safety feature may occur under a number of circumstances such as when the brewer is at boiling temperature and cannot get any hotter, as may occur in higher altitude areas, or if the heating element is defective. The microprocessor of the invention is also programmed to go to the reset mode if the temperature is sensed to be 214° F. This condition can occur if the brewer has been energized without water in a tank. As a result of such monitoring of the brewing system, the invention provides better quality coffee, elimination of double brews, extended component life, significant energy savings and safety protection involving the heater element itself.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
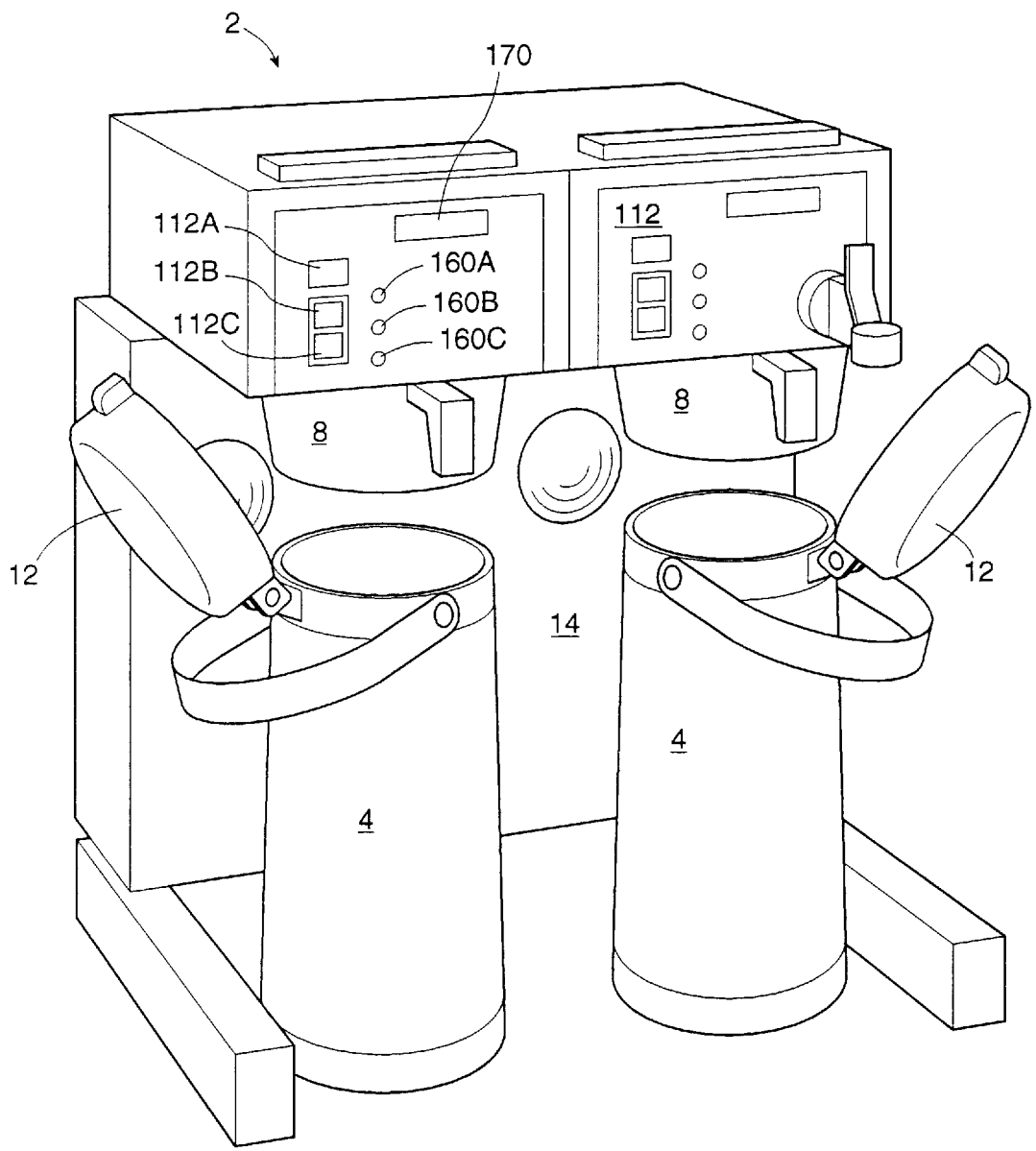
FIG. 1 is a front elevation view of one embodiment of a coffee brewing system employing the features of the invention.

Referring now to the drawings, there is illustrated one embodiment of an electronic brew control system for a coffee brewer, generally designated by reference numeral 2. The brewer system 2 of FIG. I is illustrated with respect to a dual brewing system which selectively fills a pair of coffee decanters 4 with regular or decaffeinated coffee. It is within the scope of the invention to apply its teachings to coffee systems having a single brewing station, or more than two stations as desired. Moreover, the present invention is particularly directed to coffee brewing systems which employ one or more warmer plates for each water tank, where the brewed coffee is dispensed into a glass, plastic, or stainless steel carafe, which may then be moved to another warmer plate to be kept warm while a further carafe receives yet another charge of freshly brewed coffee.

The housing of the brewer 2 includes a pair of water tanks (not shown) which are automatically connected to a source of water, and in which water is heated for a brewing operation. Each of the dual systems includes a removable coffee basket 8 in which a filter and coffee (not shown) are placed, and through which the hot water is delivered in a conventional manner to cause the water to pass through the selected basket and to flow through into a coffee decanter 4, or a coffee carafe (not shown), which is positioned beneath the operating coffee basket. The coffee decanter 4 may be of a thermally insulated type and the like and from which coffee can be dispensed as needed. As seen in FIG. 1, each of the coffee decanters 4 includes an upper lid 12 to permit the filled coffee decanter 4 to be removed and the lid closed to maintain a desired temperature. Alternatively, in the particular embodiment of the present invention discussed herein, each filled coffee carafe may be moved to a warmer plate (not shown in FIG. 1, but discussed hereafter in the respect of FIG. 4). Typically, one of the warmer plates of such a brewer system is placed beneath a coffee basket 8, so that the last brewed carafe of coffee does not get moved until another carafe is empty, or at least until a further carafe of coffee needs to be brewed.

Figure 2:
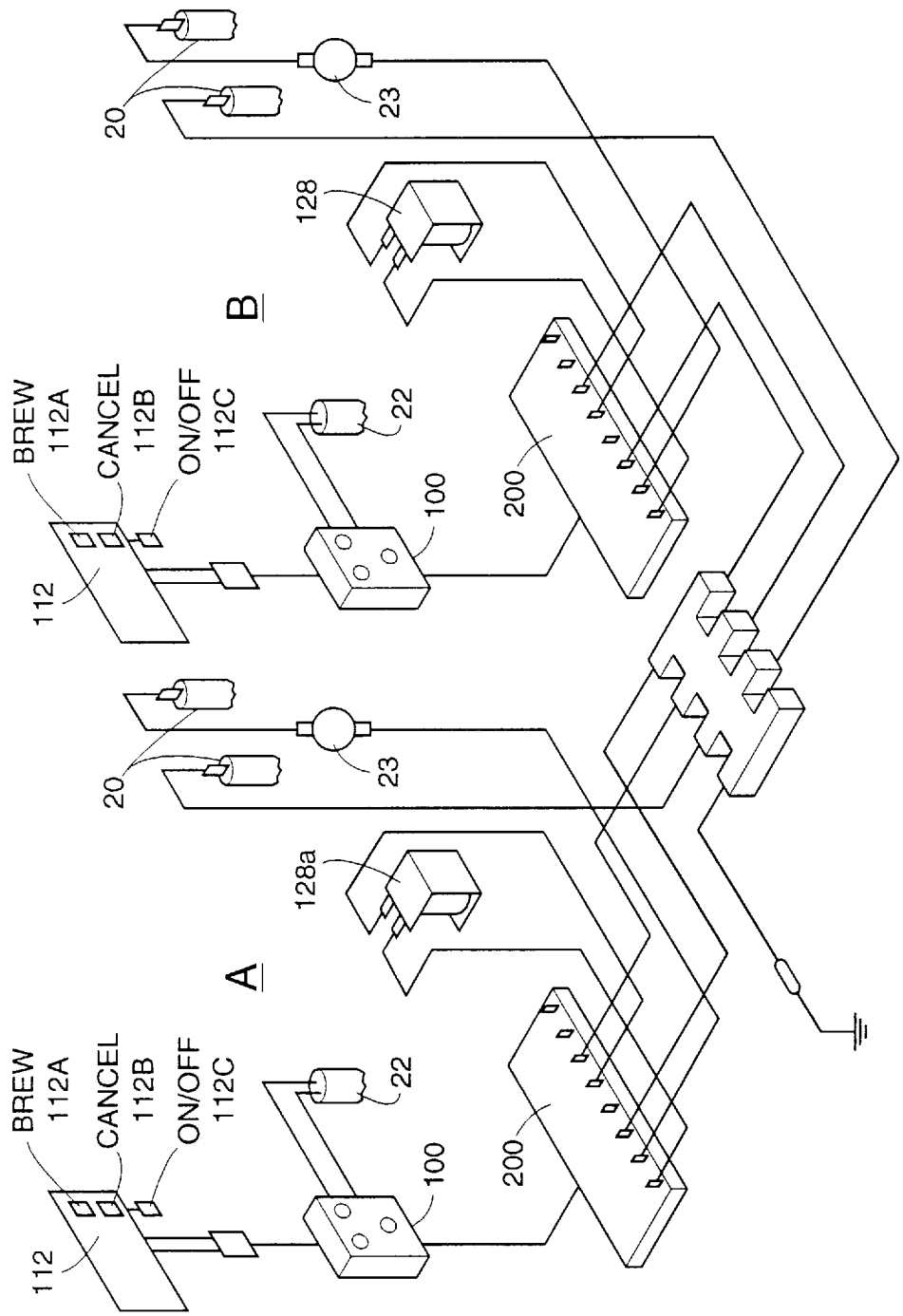
FIG. 2 is a generalized view of the control system of a coffee brewer in keeping with the teachings of this invention.

It will be understood that each of brewing systems, identified as A and B in FIG. 2, operates quite independently of the other. Accordingly, although occasionally in the discussion which follows hereafter both brewing systems A and B will be mentioned, it will be understood that the descriptions which follow are applicable to any brewing system in keeping with the present invention. Moreover, a number of significant aspects of the following discussion are particularly directed to brewing systems which dispense brewed coffee into coffee carafes which are subsequently placed on selected warmer plates that are separately controlled, as described in greater detail hereafter.

As is conventional, the internal pair of water heater tanks (not shown) within housing 14 utilize electric heater elements 20 to heat the water in each tank (FIG. 2). Conventional temperature probes 22, such as a thermistor as its function will be described, are positioned within each respective water tank to sense the temperature of the water therein. A pair of solenoid valves, as will be described, are connected to separate fluid conduits (not shown) coupled to the water tanks, so that when a solenoid valve is opened, cold water flows into the respective heater tank and displaces hot water out of the tank through an outlet above the coffee basket 8. The foregoing temperature probes and solenoid valves are controlled by the control circuits of the invention in a manner to be described.

Figure 3:
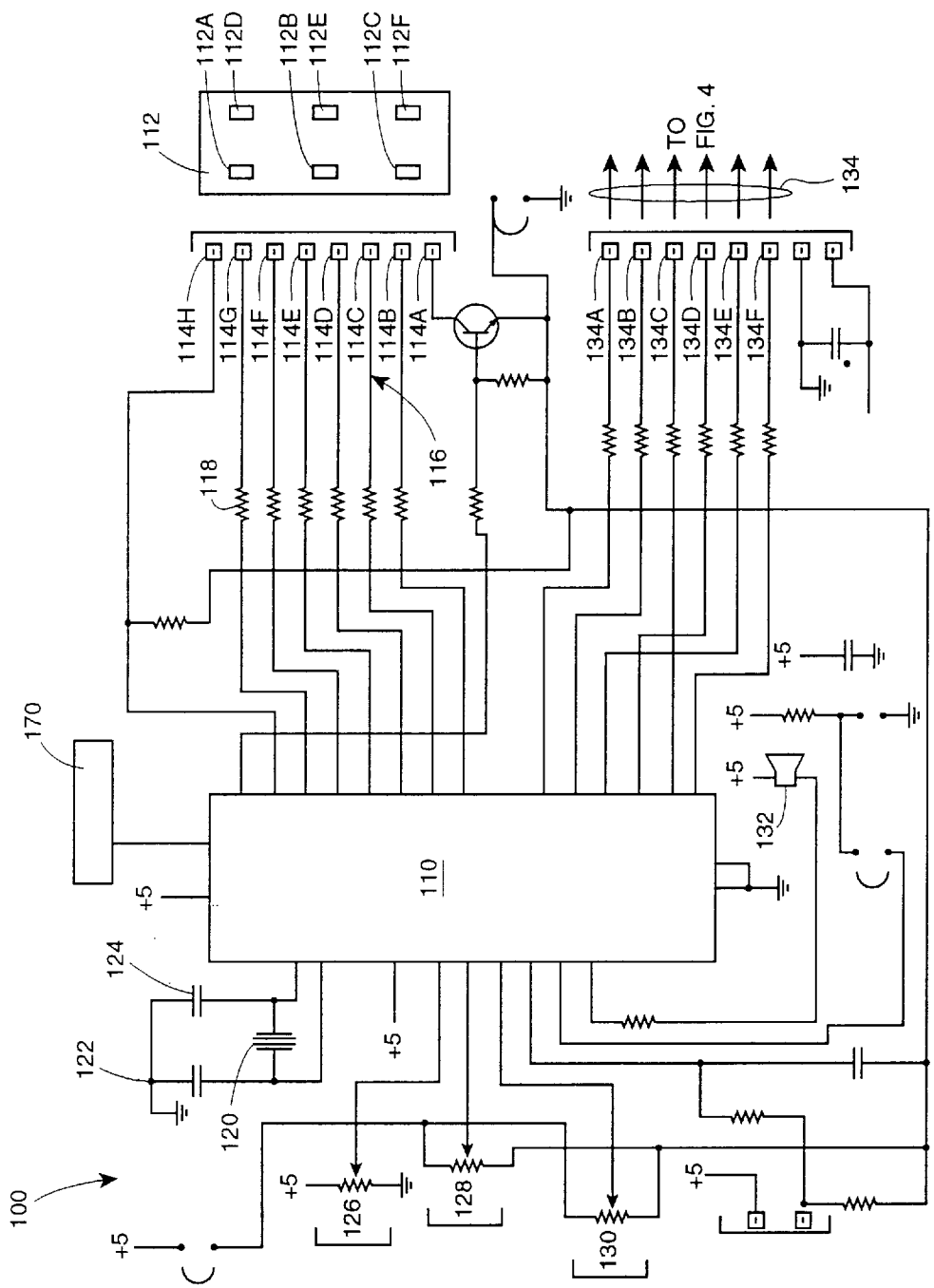
FIG. 3 is a schematic circuit of a controller board for the control system of FIG. 2.
Figure 4:
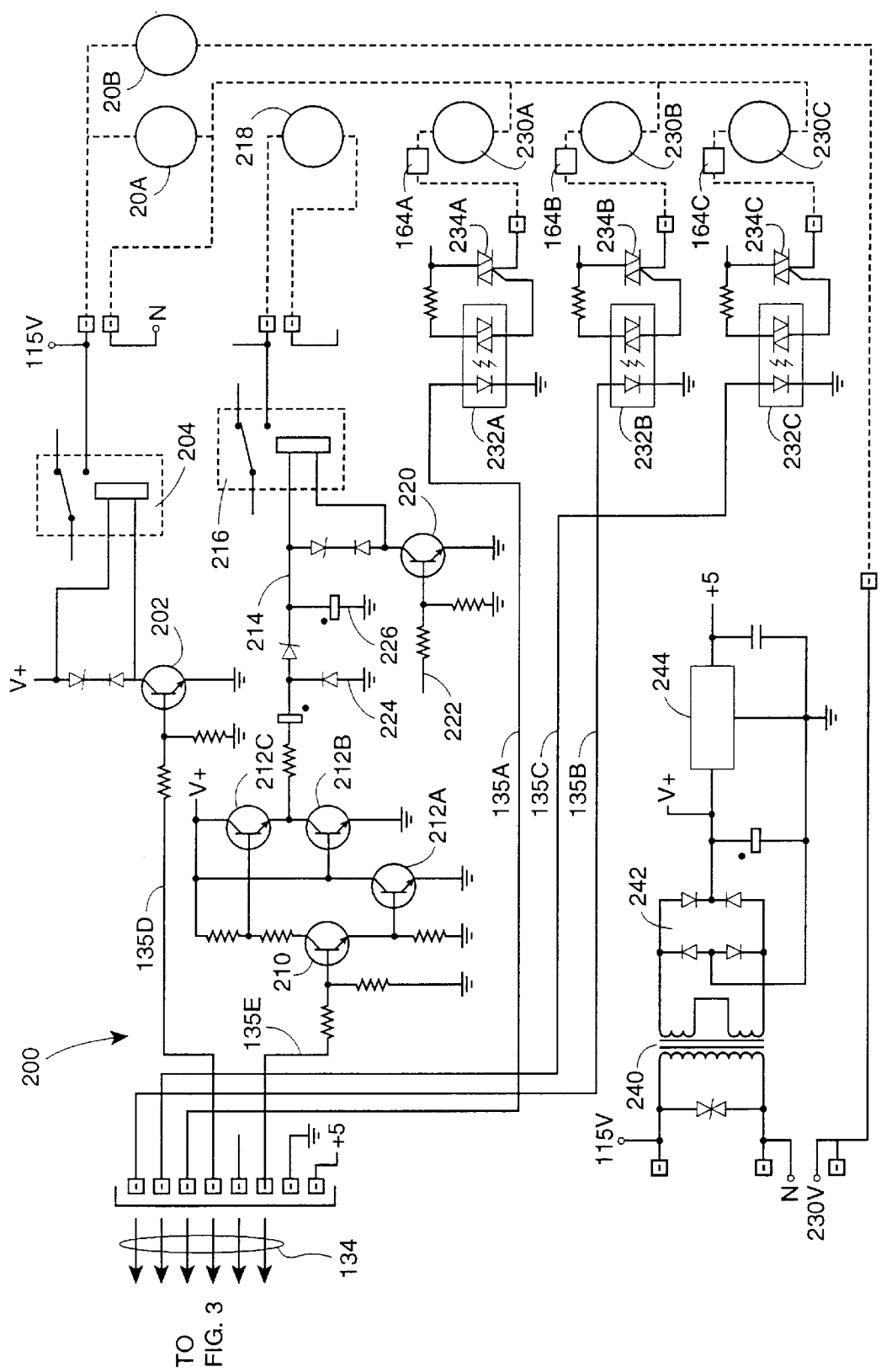
FIG. 4 is a schematic circuit of a power board for the control system of FIG. 2.

The control circuits are shown in detail in FIGS. 3 and 4. Referring now to FIG. 3, a schematic of a controller board 100 is shown. This control circuit is mounted on a printed circuit board, and includes a microprocessor 110, which in the preferred embodiment, is a PIC 16 C7 type from Microchip Technologies, Inc. Input to microprocessor 110 is achieved via keypad 112. Key pad 112 comprises a plurality of touch switches which are connected to contacts 114A through 114H Contact 114A provides a common line for the light-emitting diodes associated with key pad 112, and contact 114H provides a common line for the touch switches associated with key pad 112. The key pad 112 is shown as being on the front of the brewer 2 in FIG. 1, and in FIG. 2. The key pad includes a manual brew actuator 112A, a cancel button 112B and an on/off button 112C. Also shown in FIG. 3 are buttons 112D, 112E, and 111F, each of which will actuate a warmer plate, as discussed hereafter.

Following back along leads 116 a plurality of resistors 118 serves to reduce the voltage incident on microprocessor 110.

Program timing of microprocessor 110 is provided by a quartz crystal clock 120 having a nominal frequency of 2.0 MHz. Waveform distortions therefrom are transmitted to ground via parallel capacitors 122, 124.

Upon logical input to controller 110 via leads 116 from keypad 112, and dependent thereon, microprocessor 110 queries at least one of a plurality of variable resistors, the first of which is operative to control the brew time and is identified as brew time potentiometer 126. The brew time potentiometer 126 is operative to time the brewing cycle of the device. Solenoid valve timer 128 is operative to control one of the first and second solenoid valves 128A or 128B, depending on which of systems A or B is operative. The solenoid valves allow for the selective admission of water into the respective heater tank to displace hot water therefrom for brewing. Temperature potentiometer 130 is cooperative with a temperature probe or thermistor 22 operatively positioned in the respective heater tank to provide control over the water temperature within the brewing unit A or B, as driven by logic outputs from microprocessor 110 as shall be subsequently described. The potentiometer 130 is externally adjustable to set water temperature for brewing at a selected temperature such as 200° F., or other level. If the temperature probe 22 fails to sense an increase of, say, 2° F. in the temperature of the water in the water heater tank after a predetermined period of time—for example, four minutes—the microprocessor 110 is programmed to turn off the heating element, as noted above. Moreover, if a high limit thermostat 23 senses that the temperature within the water heater tank has exceeded a preset limit, for example 214° F., the signal from the high limit thermostat 23 will cause the microprocessor 110 to terminate operation of the brewer.

Microprocessor 110 is further operative to actuate an audio transducer 132, which is actuated by the microprocessor logic upon actuation of a key pad switch associated with either the brew button 112A or cancel button 112B located on keypad 112, as well as upon reception of a signal generated by the cooperation between clock 120 and brew timer potentiometer 126 corresponding to the completion of a brew cycle.

Microprocessor 110 activates the various operations of a brewer unit A or B via terminals 134A through 134F, and output bus 134, which are operative to take voltage outputs corresponding to logical instructions from microprocessor 110 to power board 200, as described hereafter.

Referring now to FIG. 4 which shows a schematic of the line voltage or power board, the output bus 134 from controller board 100 transfers low voltage signals from microprocessor 110 to line voltage control circuits which are resident on power board 200.

Heater control lead 134D serves as the input to transistor 202 which is operative to control heater relay 204, thereby selectively supplying power to either of heater elements 20A and 20B which are operative to provide heated brewing water to the respective coffee basket 8. In a typical installation, it is one or the other of heater elements 20A and 20B which is installed and operative in the respective water heater tank. Heater element 20A is typically rated for operation at 115 volts, as shown, while heater element 20B is typically rated for operation at 230 volts. Whichever heater element is installed, the control thereof remains the same in keeping with the teachings of this invention.

Upon receipt of an input signal from microprocessor 110 to lead 135E, transistor 210—which is biased by transistor 212A—provides a route to ground for transistor 212B which allows transistor 212C to provide current to lead 214 thereby energizing relay 216 and actuating valve 218. When valve 218 is opened, fresh water is admitted to the water heater tank, forcing hot water out of the tank to the coffee basket 8, as discussed above. However, if there is a signal on line 222 so that transistor 220 is closed, relay 216 is prevented from being actuated. That condition will exist if the brew timer 126 is still operating, meaning that a previously initiated brewing cycle has not yet been concluded. That means that a double brewing condition, as discussed above, is precluded. Moreover, once the relay 216 actuates operation of valve 218, the solenoid valve timer 128 becomes operative. Its operation is set to permit only a give amount of fresh water to be admitted to the water heater tank, thus controlling the amount of heated water which is displaced therefrom through the coffee basket 8. Back current control for the relay 216 is provided by diode 224, and the relay trigger spike is passed to ground via capacitor 226.

Leads 135A, 135B, and 135C are operative to actuate warmer plate heaters 230A, 230B and 230C via dedicated optoisolators 232A, 232B, and 232C which serve to drive triac controllers 234A, 234B, and 234C which are associated with the warmer plate heaters 230A, 230B and 230C respectively. Further discussion of the operation and control of the warmer plate heaters will follow, hereafter.

Transistor power is supplied by a step down transformer 240, which supplies alternating current to rectifier bridge 242, which supplies direct current for operation of the transistors resident on power board 200 as well as to voltage regulator integrated circuit 244, which is operative to provide conditioned power to controller board 100.

To begin operation of a brew cycle, a command signal is input from the manual brew actuator key 112A on keypad 112 to microprocessor 110. A timer sequence, which is controlled by microprocessor 110 to count cycles of clock 120, is dependent on a signal received from temperature sensor 22 as measured against brew temperature potentiometer 130. When a signal from temperature sensor 22 provides a voltage corresponding to a temperature at or above that which is registered by the voltage across brew temperature potentiometer 130, microprocessor 110 will send a signal to valve actuator lead 135F thereby commencing a brew cycle.

However, if the signal from temperature sensor 22 corresponds to a lower temperature than is registered on temperature potentiometer 130, the microprocessor 110 will activate lead 135D, so as to raise the water temperature in the water heater tank to within desired parameters, as discussed.

Should the brew timer potentiometer 126, working in concert with clock 120, register that a brew cycle is in operation, the microprocessor 110 will disengage the valve actuator lead 135E, as discussed.

If the clock 120 registers a sufficient passage of time without an input from keypad 112 corresponding in the preferred embodiment to a time of approximately three hours, microprocessor 110 resets the range of input from thermistor 22 so as to allow for a larger temperature range of brewing water temperature before signalling heater 20A or 20B to bring the brewing water up to the set temperature provided by brew temperature potentiometer 130. This is the so-called AFTER HOURS mode of operation, and it allows for significant energy savings when the coffee brewing system is permitted to remain idle for extended periods of time, such as overnight in restaurants, office installations, etc., or over a weekend in such situations.

It has been noted above, and in FIG. 4, that there are several warmer plate heaters. For purposes of the present discussions, they are identified in FIG. 4 as warmer plate heaters 230A, 230B, and 230C.

In any embodiment of the present invention where brewed coffee (or other beverage) is dispensed into a carafe after it has been brewed, that carafe it placed immediately beneath the coffee basket 8 so that the brewed beverage flows from the basket 8 into a carafe (not shown). The carafe sits on a warmer plate 230A, which is designated the primary warmer plate.

Coffee brewing apparatus of the sort particularly described herein, for use in commercial installations such as restaurants or the like, or installations in offices or factories where coffee is being supplied for employees or visitors, will generally have at least two or three warmer plates, sometimes more. There are several reasons for that: Not the least of those reasons is that it is quite usual for there to be several different blends of coffee being offered for consumption or sale at the same time. Usually, at least one carafe of decaffeinated coffee is made available. Moreover, in high traffic areas, it may be necessarily for there to be supplies of coffee to be available at all times—at least during normal operating or working hours—so that as one or two carafes of coffee are being consumed, another carafe of coffee is being brewed.

Accordingly, each of these other warmer plates, such as warmer plates 230B and 230c, are designated to be secondary warmer plates.

The distinction is particularly the following: Whenever a brew cycle is initiated, as soon as delivery of the heated water from the heated water tank to the coffee basket 8 has begun, the primary warmer plate 230a is turned on. If it has been on, it may be momentarily turned off then turned on. Also, at least a first timed countdown period is initiated, as will be discussed hereafter. Thus, the microprocessor 110 includes reset means which will initiate a timed countdown period for the primary warmer plate and which will turn on the primary warmer plate 230A, or at least ensure that it has been turned on, each time delivery of the heated water to the product to be brewed in the coffee brewer basket 8 has started after a new brewing cycle is initiated.

Because the present invention allows for a cool down period during the AFTER HOURS mode, as discussed above, it might be that the water in the heated water tank is as much as 25° F. or 30° F. cooler than it should be to permit delivery to the coffee basket and thence to the carafe as brewed coffee. Accordingly, for reasons that will become more evident hereafter, it is important that the timed countdown period begin, and that the primary warmer plate be turned on, when delivery of the brewed coffee to the carafe commences.

Obviously, such circumstances will occur at the beginning of each day, especially if the brewing apparatus has stood idle overnight or over a weekend, or the like.

Accordingly, the reset means by which the primary warmer plate is turned on, or is assured to have been turned on and, in any event, the first timed countdown period (discussed hereafter) are essentially software controlled. There is no need for a particular switch to be provided to turn on the primary warmer plate; but, for other reasons and purposes, such a switch may appear to be in place as discussed hereafter.

If a second carafe of coffee is to be brewed shortly after the first carafe of coffee has been brewed, so as to allow for a high volume of consumption or so as to permit differing blends of coffee to be prepared, each subsequent carafe of coffee will be placed on one of the secondary warmer plates, of which there is at least one. Switch means are provided to turn on each of the warmer plates; although, as noted above, it is usual that the primary warmer plate will automatically be turned on as soon as brewed beverage to the carafe has begun. The switches for turning on the warmer plates are found on the keypad 112, and are generally identified as switches 112D, 112E, and 112F, in FIG. 3.

Another important aspect of the present invention is that it is recognized that, at the end of a day or the end of a shift, it is quite possible that some or all of the warmer plates will remain on. If, for example, a warmer plate remains on at the end of a day before a weekend, and there are no means such as those provided by the present invention to turn off the warmer plate after a predetermined period of time, several issues arise. The first is, of course, that maintaining delivery of electrical power to a warmer plate for as much as 72 hours is a waste of energy. Moreover, if there has remained a small amount of coffee in a carafe, and it remains heated for as much as 72 hours, it is possible that the solids which remain in the coffee as the water is evaporated will eventually scorch, if not burn. Still further, if heat remains applied to such as a glass decanter for an extended number of hours, ultimately the glass will become dry and brittle so that the carafe might break more easily than it otherwise should.

Accordingly, the present invention provides for a first countdown timer which is associated with each warmer plate to countdown at least a first selected time period for each respective warmer plate. The countdown of the first selected time period is re-started each time the respective warmer plate is turned on or reset. As noted above, the first countdown selected time period for the primary warmer plate 230A will begin when brewed coffee begins to be dispensed into the carafe; the other secondary warmer plates will have their first selected time period begin when they are turned on by actuation of the respective switch—or otherwise, as discussed hereafter. In any event, the microprocessor 110 will continuously poll each of the primary and secondary warmer plates to determine whether its first selected time period is counting down; and, if that countdown period continues without being re-started, at the end of the first countdown period the respective warmer plate will be turned off. Generally, that first time countdown period is in the order of three hours, but it is not unusual for that first selected countdown time period to be in the range of from one hours to five hours.

Moreover, because the primary warmer plate is turned on—or is assured to have been turned on—each time a new brewing cycle is initiated and delivery of the brewed beverage to a carafe sitting on the primary warmer plate has begun, there is an override provision in the apparatus of the present invention that overrides the first selected time periods for each of the secondary warmer plates, such that if the primary warmer plate is turned off at the expiration of its first selected countdown time period, the secondary warmer plates will also be turned off even if they have not yet reached the end of their own respective first selected time period.

The rationale for that decision is that, if no fresh coffee has been brewed, by the end of two or three or four hours, no coffee on any warmer plate will have any drinking quality, so there is no point in keeping that coffee warm any longer in the event that the personnel attending to and controlling the operation of the brewing apparatus have forgotten to turn off the warming plates.

It has been noted above that the microprocessor can be arranged so that the controllable heating element 20A or 20B and the temperature detector or thermistor 22 associated with it, will permit the temperature of the heated water in the water tank to drop to a third predetermined temperature, as discussed. This AFTER HOURS mode is also termed to be a cool down period for the brewing apparatus of the present invention. As soon as any new brewing cycle is initiated, so that a heating cycle for the heated water to heat the water up to the first predetermined temperature is also initiated, it is obvious that the cool down period has been terminated.

Another aspect of the present invention is to recognize that the drinking quality of coffee may expire in a relatively short period of time. Typically, coffee loses its drinking coffee in a period of from twenty to sixty minutes, depending on a number of factors which are outside the scope of the present invention. However, it is appropriate for a drinking quality timer to be associated with each warmer plate, so that when the brewed beverage resting in a carafe on a respective warmer plate becomes older than about twenty to sixty minutes, a signal can be given and that beverage can be disposed of and a new brewing cycle initiated. Accordingly, the microprocessor 110 includes a countdown timer means associated with each warmer plate which counts down a second selected time period which is shorter than the first selected time period for each selected warmer plate. The first and second selected time periods for each warmer plate are initiated simultaneously, each time the respective warmer plate is turned on.

If the second, shorter selected time period expires, then an annunciator will give a signal to warn the operator that the drinking quality for the respective coffee has expired. However, the warmer plate is not turned off at that time, because a decision might be made shortly after the signal has been given to consume the beverage in any event, or to sell it for a reduced price, for example.

Typically, the signal may be from a lamp such as lamp 160A, 160B, or 160C, associated with each of the respective warmer plates 230A, 230B, and 230C; or an audio transducer such as audio transducer 132 might emit a sequence of beeps. Of course, both such signals might also be given. Moreover, it is not necessary that there be a lamp associated with each warmer plate, it being assumed in that case that the operator is aware of which warmer plate has the oldest beverage placed on it so that, when a signal is given, the appropriate decision can be made with respect to the beverage which is to be found in the appropriate carafe.

In the event that the brewer apparatus in keeping with the present invention is arranged so as to dispense coffee into thermal coffee decanters 4, as noted above, it is still possible for a selected time period to be initiated for a specified thermal coffee decanter. In that case, the time period—which is equivalent to the second selected time period for any warmer plate, and which is chosen so as to signal the end of the time period from when the coffee has been brewed until it loses its drinking quality—maybe as much as 120 minutes. After coffee has been brewed and dispensed into a thermal coffee decanter, it loses heat relatively slowly so that it does not cool down very quickly. Moreover, a coffee decanter may have a significantly higher storage than a coffee carafe; and, indeed, somewhat different grinds of coffee and brewing temperatures might also be chosen if the brewing apparatus is intended to discharge its brewed beverage into a thermal decanter rather than into a carafe. Thus, a longer drinking quality time may be chosen.

Returning to a discussion of the brewing apparatus of the present invention when it is intended for use with coffee carafes which are placed on warmer plates, it is also possible to arrange that each of the first and second selected time periods for each of the secondary warmer plates 230B, 230C, are automatically started each time a full carafe of freshly brewed beverage is placed on the respective secondary warmer plate. In that manner, it may not be necessary for the operator to touch the appropriate key or switch pad —for example, key or switch pad 112E or 112F—and other means can be arranged determine that the carafe of beverage placed on the respective secondary warmer plate is full. For example, weighing means such as a strain gauge or a pressure sensitive switch, shown generally at 164B and 164C, can be associated with secondary warmer plates 230B and 230C. If a carafe which has at least a predetermined weight—being the tare weight of a typical carafe plus the weight of beverage within it when it is full—is placed on one of the secondary warmer plates, a signal can be sent to the microprocessor 110 that it is a fresh carafe of brewed beverage. Otherwise, once some of the beverage has been dispensed from a full carafe, its weight would reduce and the strain gauge or pressure sensitive switch would be able to determine that the carafe is not full and therefore that it is not necessary to initiate a new second selected countdown time period.

Alternatively, light activated means can be associated with each secondary warmer plate 230B or 230C to determine that the level of the beverage in the respective carafe placed on the warmer plate has at least reached a predetermined level and is not below that level. For example, a lamp, light emitting diode, or other visible or invisible light emitting device can be placed at one side of each warmer plate, and a receptor placed at the other side of the warmer plate. If the level of the beverage in the carafe is above a preselected level, that fact will be sensed because transmission of light would be blocked or diffused by the beverage, and that fact would be indicative of a fresh carafe of beverage being placed on the warmer plate. Other arrangements, which are outside the scope of this present invention, may also be provided.

It is generally contemplated that each of the switches which is arranged with each key 112A through 112F on keypad 112, either electrical, electromechanical, or software controlled, is one which toggles its condition. Each switch is generally a binary switch, so that it is either on or off, or so that the function associated with that switch is either on or off.

However, one of the switches, such as switch 112C, is usually that which is designated to be the on/off key or switch. Another switch such as 112A, is the key which will generally initiate a brew cycle. The same key might also be arranged to cancel a brewing cycle, such as if it is touched with a short period of time, such as several seconds. Alternatively, a further switch or key, such as 112B can be designated to cancel a brewing cycle. As noted, other keys can be particularly arranged for each secondary warmer plate, and, for other reasons, key 112D might also be arranged at least to permit determination of the status of the primary warmer plate.

To that end, a visual status readout panel 170 can be associated with microprocessor 110. Manipulation of the keys on the keypad 112 can be arranged so that they will selectively indicate the current status of any one of those keys and its associated switch on the panel 170. Thus, the current status of any brewing cycle, heating cycle, or the first and second time periods for any of the primary or secondary warmer plates, can each be determined by appropriate manipulation of the keys on the keypad, or other keys provided for those purposes.

It may very often occur that a brewing apparatus in keeping with the present invention might be placed in a location where many persons other than those who are intended or authorized to operate the apparatus may have access to it. For example, in some office or factory situations, only certain designated persons may be appointed to supervise and/or operate a coffee brewer apparatus. A more typical situation may occur in such as a convenience store, or in a supermarket where the brewing machine is placed for the convenience of customers. However, it is desirable in such circumstances to provide for a key lock-out mode. In such circumstances, any selected operation of the brewer apparatus can be precluded from being affected or overridden by manipulation of the otherwise obviously designated key or switches on the key pad. However, for safety and energy saving purposes, it is usual that the first selected time countdown period for the primary warmer plate 230A will continue without being overridden or without the possibility of being overridden. Otherwise, it can be arranged that, by touching a predetermined combination of keys simultaneously, or by touching a predetermined combination or sequence of keys within a predetermined time period, any selected operation of the brewer apparatus can be locked out and precluded. A further example is that specific combinations of keys or specific sequences of key actuations may permit the selection of the first selected time period for the primary warmer plate, or the selection of the first selected time period for each secondary warmer plate, or the selection of any second selected time period for each warmer plate.

Yet another embodiment of the present invention will permit a determination of the number of brew cycles that have been performed. Here, a counter is included within the microprocessor, which counter will increment each time a new brewing cycle is initiated; thus, it will count the number of brew cycles that have been performed by the apparatus. Of course, that counter can be reset to zero, in keeping with the circumstances for which it is provided.

Those circumstances are that, especially in some geographic areas, or for other reasons, it may be desirable to provide water filters that are installed in the water line which is connected directly to the brewer apparatus. A determination can be made that, after the filter has had a predetermined volume of water flowing through it, it can be cleaned or replaced. This can be accomplished especially since the beverage brewing apparatus in keeping with the present invention is a water displacement apparatus, whereby fresh water is admitted to the water heater tank as heated water is dispensed from it, so that a known volume of water flow can be determined as a consequence of the number of brew cycles that have been initiated.

Indeed, the status of the brew cycle counter can be determined such as on the display panel 170 or other display panel provided for that purpose (not shown), so that the number of brew cycles that have been performed since the counter was set or reset can be displayed at any time, upon receipt of an instruction to the microprocessor 110 to do so. Such instruction is generally accomplished by a predetermined combination of keys or a predetermined combination or sequence of keys within a predetermined time period.

Other modifications and alterations may be used in the design and manufacture of the apparatus of the present invention without departing from the spirit and scope of the accompanying claims.

What is claimed is:

1. Apparatus for brewing a beverage and for keeping a brewed beverage warm, wherein a beverage is brewed by heating water and delivering heated water to a product to be brewed by passing hot water through said product to extract flavor therefrom, and dispensing a brewed product into a carafe;

wherein said apparatus comprises a microprocessor, a water heater tank having a controllable heating element therein, delivery means operatively coupled to said water heater tank to initiate a brewing cycle and to deliver a predetermined volume of heated water which is heated at least to a first predetermined temperature below boiling to said product during each selected brewing cycle, temperature detection means for determining the temperature of said heated water at any time under the control of said microprocessor and for initiating a heating cycle for said heated water whenever its temperature drops below a second predetermined temperature which is lower than said first predetermined temperature, and actuator means to preclude delivery of said heated water to said product when the temperature thereof is below said predetermined temperature, said apparatus further comprising:

a primary warmer plate, and at least one secondary warmer plate;

respective switch means to turn on each warmer plate and to turn off each warmer plate;

countdown timer means associated with each warmer plate to count down at least a first selected time period for each respective warmer plate, each time a respective warmer plate is turned on;

reset means for turning on a respective secondary warmer plate and for initiating a new timed countdown period for each secondary warmer plate each time a fresh brewed beverage carafe is placed thereon;

reset means for initiating a new first selected timed countdown period for said primary warmer plate, and for turning on said primary warmer plate, each time delivery of said predetermined volume of heated water to said product has started after a new brewing cycle is initiated; and turn-off means for turning off all of said warmer plates when said first selected timed countdown period for said primary warmer plate is concluded, and for initiating a cool down period for said apparatus.

2. The apparatus of claim 1, wherein said microprocessor controls said controllable heating element and said temperature detection means to permit the temperature of said heated water to drop to a third predetermined temperature which is lower than said second predetermined temperature whenever said cool down period has been initiated, and to initiate a heating cycle for said heated water to heat said water to said first predetermined temperature whenever a new brewing cycle is initiated during said cool down period, whereby said cool down period is terminated.

3. The apparatus of claim 2, wherein said countdown timer means associated with each warmer plate also counts down a second selected time period which is shorter than said first selected time period for each respective warmer plate, wherein said first and second selected time periods are each initiated simultaneously each time a respective warmer plate is turned on; and wherein said apparatus further comprises an annunciator to give a signal whenever a respective second selected time period for any said warmer plate has been concluded.

4. The apparatus of claim 3, wherein said annunciator to give a signal is chosen from the group consisting of a sequence of beeps from an audio transducer, a visual signal from a lamp or light emitting diode, or both.

5. The apparatus of claim 4, wherein a separate lamp or light emitting diode is arranged for each of said warmer plates, so that it is known for which warmer plate said second selected time period has been concluded.

6. The apparatus of claim 3, wherein said first selected time period for said primary warmer plate is in the range of two hours to four hours, wherein said first selected time period for each secondary warmer plate is in the range of one hour to four hours, and wherein said second selected time period for each of said warmer plates is in the range of from twenty to sixty minutes.

7. The apparatus of claim 6, wherein each of said first and second selected time periods for each respective warmer plate may be individually selected.

8. The apparatus of claim 3, wherein said first and second selected time periods for each said secondary warmer plate are automatically started each time a full carafe of freshly brewed beverage is placed on a respective secondary warmer plate.

9. The apparatus of claim 8, further including determining means associated with each said secondary warmer plate to determine that a carafe of beverage placed on a respective secondary warmer plate is a full carafe and not otherwise.

10. The apparatus of claim 9, wherein said determining means is chosen from the group consisting of weighing means to determine that the weight of a carafe and the beverage therein is at least a predetermined weight, and light activated means to determine that the level of the beverage in the carafe has at least reached a predetermined level and is not below that level.

11. The apparatus of claim 10, including a strain gauge or a pressure sensitive switch.

12. The apparatus of claim 6, including a keypad and associated switches, and having a plurality of keys including at least an on/off key, a key to initiate a brewing cycle, a key to cancel a brewing cycle, and a key for each secondary warmer plate to selectively turn on that respective secondary warmer plate;

wherein the switch which is associated with each key is chosen from the group consisting of mechanical switches, electromechanical switches, and software switches under the control of said microprocessor.

13. The apparatus of claim 12, further including a visual status readout panel associated with said microprocessor, which will selectively indicate the current status of any key and its associated switch, and the current status of any brewing cycle, heating cycle, and first and second selected time periods for any selected warmer plate, under the control of said microprocessor.

14. The apparatus of claim 13, wherein any selected operation of said apparatus except the first selected time countdown period for said primary warmer plate can be locked out and precluded by touching a predetermined combination of keys simultaneously, or by touching a predetermined combination or sequence of keys within a predetermined time period.

15. The apparatus of claim 14, wherein specific combinations of keys or specific sequences of key actuations will permit the selection of the first selected time period for said primary warmer plate, the selection of the first selected time period for each secondary warmer plate, and the selection of each second selected time period for each of said warmer plates.

16. The apparatus so claim 3, further including a counter which increments each time a new brewing cycle is initiated, so as to count the number of brew cycles that have been performed by said apparatus since each time said counter is set or reset, whereby a signal can be given after a preselected number of brew cycles has been performed.

17. The apparatus of claim 16, further including a visual display associated with said microprocessor, whereby the number of brew cycles that have been performed can be displayed at any time upon an instruction to said microprocessor to do so.

* * * * *